US011945700B2

(12) United States Patent
Moritz Urban

(10) Patent No.: US 11,945,700 B2
(45) Date of Patent: Apr. 2, 2024

(54) VEHICLE CRANE COMPRISING A JIB SYSTEM

(71) Applicant: Tadano Demag GmbH, Zweibrücken (DE)

(72) Inventor: Christian Moritz Urban, Zweibrücken (DE)

(73) Assignee: Tadano Demag GmbH, Zweibrücken (DE)

( * ) Notice: Subject to any disclaimer, the term of this patent is extended or adjusted under 35 U.S.C. 154(b) by 23 days.

(21) Appl. No.: 17/520,913

(22) Filed: Nov. 8, 2021

(65) Prior Publication Data

US 2022/0144601 A1 May 12, 2022

(30) Foreign Application Priority Data

Nov. 9, 2020 (DE) ......................... 102020129454.9

(51) Int. Cl.
*B66C 23/70* (2006.01)
*B66C 23/42* (2006.01)

(52) U.S. Cl.
CPC ............ *B66C 23/702* (2013.01); *B66C 23/42* (2013.01); *B66C 23/705* (2013.01); (Continued)

(58) Field of Classification Search
CPC ....... B66C 23/42; B66C 23/702; B66C 23/68; B66C 23/82; B66C 23/823
See application file for complete search history.

(56) References Cited

U.S. PATENT DOCUMENTS 9,371,215 B2 * 6/2016 Willim .................... B66C 23/82
11,130,659 B2 9/2021 Muller
(Continued)

FOREIGN PATENT DOCUMENTS

CN 202924635 U 5/2013
CN 107117542 A 9/2017
(Continued)

OTHER PUBLICATIONS

CN 108792964A Machine Translation. (Year: 2018).*
(Continued)

*Primary Examiner* — Michael R Mansen
*Assistant Examiner* — Juan J Campos, Jr.
(74) *Attorney, Agent, or Firm* — Gardner, Linn, Burkhart & Ondersma LLP

(57) ABSTRACT

A vehicle crane having a superstructure with a jib system including a main jib mounted in a luffable manner on the superstructure, with a jib head and a luffable additional jib and at least one luffing support supported in the region of a luffing axis of the additional jib. At least one guying support of the jib system is arranged in such a manner that a tensioner starting on the one hand from the superstructure and/or from a counterweight and connected on the other hand to the additional jib is guided via the at least one guying support and the at least one luffing support. A main jib extension is incorporated between the jib head and the additional jib with the at least one guying support supported at the main jib extension to obtain a longer design of the jib system with the highest possible permissible bearing load.

19 Claims, 3 Drawing Sheets

(52) U.S. Cl.
CPC .......... *B66C 23/707* (2013.01); *B66C 23/703* (2013.01); *B66C 2700/0321* (2013.01); *B66C 2700/0392* (2013.01); *B66C 2700/062* (2013.01)

(56) References Cited

U.S. PATENT DOCUMENTS

| | | | | |
|---|---|---|---|---|
| 11,167,962 | B2 | 11/2021 | Weckbecker et al. | |
| 11,174,137 | B2 | 11/2021 | Muller | |
| 2009/0127219 | A1* | 5/2009 | Willim | B66C 23/702 212/300 |
| 2009/0134108 | A1* | 5/2009 | Willim | B66C 23/82 212/270 |
| 2012/0312767 | A1* | 12/2012 | Bohnacker | B66C 13/46 701/50 |
| 2016/0221799 | A1* | 8/2016 | Muench | B66C 23/62 |
| 2021/0139296 | A1 | 5/2021 | Heintz | |
| 2021/0179398 | A1 | 6/2021 | Urban | |
| 2021/0188601 | A1 | 6/2021 | Urban | |
| 2021/0261388 | A1 | 8/2021 | Urban | |
| 2021/0323796 | A1 | 10/2021 | Zimmer | |
| 2022/0073321 | A1 | 3/2022 | Moritz Urban | |

FOREIGN PATENT DOCUMENTS

| | | | | | |
|---|---|---|---|---|---|
| CN | 108792964 | | * | 11/2018 | B66C 23/68 |
| CN | 111137796 | A | | 5/2020 | |
| DE | 10028513 | A1 | * | 1/2002 | B66C 23/207 |
| DE | 102005049606 | A1 | | 4/2007 | |
| DE | 102007056289 | B4 | | 6/2009 | |
| DE | 202013003309 | U1 | | 7/2014 | |
| DE | 202017107301 | U1 | | 12/2018 | |
| DE | 102018122349 | A1 | | 3/2020 | |
| EP | 1634846 | B1 | | 12/2009 | |
| WO | 2020011657 | A1 | | 1/2020 | |

OTHER PUBLICATIONS

DE 10028513A1 Machine Translation (Year: 2002).*
CN 107117542A Machine Translation. (Year: 2017).*
Co-pending U.S. Appl. No. 17/556,158, filed Dec. 20, 2021.

* cited by examiner

VEHICLE CRANE COMPRISING A JIB SYSTEM

CROSS REFERENCE TO RELATED APPLICATION

The present application claims the priority benefits of German Application No. 10 2020 129 454.9, filed on Nov. 9, 2020.

BACKGROUND AND FIELD OF THE INVENTION

The invention relates to a vehicle crane which comprises a superstructure with a jib system which has a main jib, which is mounted in particular in a luffable manner on the superstructure, with a jib head as well as a luffable additional jib and at least one luffing support supported in the region of a luffing axis of the additional jib, wherein a guying support of the jib system is arranged in such a way that a tensioner, which on the one hand starts from the superstructure and/or from a counterweight and on the other hand is connected to the additional jib, is guided via the guying support and the at least one luffing support.

In addition to their stationary or mobile designs, cranes differ primarily in terms of the structure of their respective jib system. While their telescopic design (telescoping jib) has at least two boxes which are arranged one inside the other and can be displaced linearly relative to each other, their non-telescopic forms are generally based, however, on one or more truss girders or lattice girders which are strung together. Reaching great heights requires a sufficiently dimensioned jib system, the length of which can be adjustable by using an extension. In order to maintain the required distance from the base of the crane, at least the free end portion of the jib system is generally configured in a luffable manner accordingly. Due to the extreme load of such jib systems, they are equipped with suitable guying arrangements in order to still be able to achieve economical and practicable dimensions. The aim here is to reduce the bending moments within the jib system through targeted division into forces which can be absorbed via pressure means and tensile means.

International laid-open document WO 2020/011657 A1 disclosed a vehicle crane comprising a jib system luffably mounted on its superstructure. This comprises a main jib, on the jib head of which an additional jib, which can be luffed in relation to the main jib, is indirectly arranged. The additional jib is guyed by means of a tensile means which extends from the superstructure and is connected by its free end to the additional jib. On its way from the superstructure to the additional jib, the tensile means is guided via at least one luffing support, which is supported on the additional jib in the region of a luffing axis thereof, and a guying support, wherein the guying support is supported on the main jib. The thus achieved deflection of the tensile means via the at least one luffing support and the guying support results in improved angles in relation to the directions of the inner forces, thus increasing the bearing load of the jib system overall.

Chinese laid-open document CN 107 117 542 A also discloses a vehicle crane, the jib system of which likewise comprises a main jib with an additional jib arranged in a luffable manner on its jib head. In addition to the luffing support supported on the additional jib in the region of the jib head, the tensile means is also guided here via said luffing support and a guying support supported on the main jib. The tensile means is not made in one piece, but, in a portion located between the luffing support and the guying support, is separated from the other portions of the tensile means such that the length of this tensile means intermediate portion can be changed independently. In particular, the portion of the tensile means extending between the luffing support and the additional jib is fixedly connected thereto, and so the luffing of the additional jib is based on a corresponding manipulation of the length of the tensile means intermediate portion.

Furthermore, the German patent specification DE 10 2007 056 289 B4 describes a vehicle crane whose jib system consists of a telescopic main jib, a lattice jib main jib extension attached thereto and a luffing additional jib connected thereto. In this case, the main jib and the main jib extension are additionally tensioned by a tensile cable that runs from a foot of the main jib via a guying support to a head of the main jib extension. The guying support is supported on a head of a basic box of the telescoping main jib. In addition, a luffing arrangement is provided for the additional jib, which has a luffing cable that runs from a superstructure of the vehicle crane over three luffing supports in the area of the luffing connection of the additional jib to the main jib extension to a tip of the additional jib.

An extension of the known jib systems is not possible or is associated with a corresponding reduction in the then permissible bearing load by reason of the specified guidance of the tensile means. In view of these restrictions, there is still room for the hitherto known systems to be improved.

SUMMARY OF THE INVENTION

The present invention is directed towards the further development of a vehicle crane in relation to its jib system such that, in spite of the longer configuration, the jib system permits the highest possible permissible bearing load.

In accordance with an aspect of the invention, a main jib extension which is incorporated between the jib head and the additional jib, wherein the at least one guying support is then supported at the main jib extension. In other words, this initially increases the length of the main jib via the main jib extension accordingly, while the position of the guying support on the main jib, which is known per se, is repositioned away from the main jib towards the main jib extension. Even if it is always assumed that one guying support is provided, it is also feasible in an alternative embodiment to provide a plurality of guying supports which can be arranged both one behind the other and/or next to one another. Preferably, however, there is a single guying support or two guying supports arranged next to one another.

With regard to the arrangement of the at least one luffing support in the region of the luffing axis, the term in the region is understood to mean that, as seen in the longitudinal direction of the main jib or main jib extension, a region of in each case 1 m in front of and behind the luffing axis is covered.

In a particular embodiment, the main jib extension has at least a length of 6 m, preferably 12 m. This length indication is intended to delimit the main jib extension in accordance with the invention from conventional adapters which are used in order to establish a luffing connection on the jib head of the main jib. Such adapters can also lead to a main jib extension of just a few meters. In terms of the invention, these adapters are not understood as extensions but only as connection structures.

The embodiment in accordance with the invention renders it possible to achieve, depending on the length of the main jib extension, a sometimes significant height gain in relation to the otherwise usual working range of the vehicle crane. At the same time, the novel arrangement of the guying support creates an advantageous force ratio within the entire jib system in order to continue to enable the highest possible or even increased bearing load.

At least when the vehicle crane is in operation, the tensile means or tensioner can be supported on the guying support, wherein it is deflected from its otherwise linear extension by the guying support or is deflected thereon. The normal force introduced into the guying support via the tensioner is then supported on the main jib extension, which is coupled to the main jib, or/and the jib head. Since the main jib or the combination of main jib and main jib extension acts as a cantilever arm, it is subject to load-dependent deflection. The normal force from the guying support counteracts said deflection, which as a result leads to advantageous stabilization of the jib system. The guying support can thus cooperate with the already existing and pretensioned tensioner, thus making it possible to avoid the installation of an additional guying strand which otherwise is to be assembled and pretensioned in a time-consuming manner.

In an alternative embodiment, a deflection roller can advantageously be rotatably mounted at a free end of the guying support, the tensioner then being guided via said deflection roller. It is feasible for the tensioner to terminate in the region of the at least one luffing support. The connection to the additional jib or/and a further luffing support can then be established in a suitable manner via other tension members, such as e.g. at least one guying rod. In an embodiment which is flexible in comparison thereto, this can also be at least one cable, a band or a chain as well as combinations of the aforementioned.

In order to facilitate transport or/and assembly of the guying support, it can be pivotably arranged on the main jib extension or/and the jib head. This allows the guying support to be raised from a substantially laid down inoperative position to an operating position and vice versa.

The guying support can be pivoted via a rotary drive or a linear drive, such as a hydraulic cylinder. In terms of self-raising, the possible pivoting movement of the guying support can also be based on a change in length of the main jib, at least in sections, in that the length of the tensioner remains unchanged or changes in an at least different way, which then leads to a forced pivoting movement of the guying support. By way of at least one safety cable that is connected e.g. to the main jib extension and/or the main jib, the maximum raising of the guying support can be limited accordingly.

Of course, it is also feasible to have a configuration of the guying support which permits the at least limited change in length thereof. This would allow e.g. the deflection and/or connection region of the tensioner on the guying support to be changed relative to the rest of the jib system, if required.

According to a particular aspect of the invention, the length of an intermediate portion of the tensioner extending at least partially from the guying support to the luffing support can be changed. In an advantageous manner, the change in length is effected independently of the remaining tensioner. The ability to change the length of sections of the tensioner between the guying support and the luffing support can be used to manipulate the orientation of the luffing support independently of the orientation of the additional jib. In this way, the load that can be introduced and transmitted into the jib system via and through the tensioner can be optimized, in particular depending upon the situation. The forces which can be statically broken down into individual components can thus be adapted accordingly in their respective direction of action in order to obtain a force ratio which is as balanced as possible and is adapted to the load-bearing capability of the individual parts of the jib system.

In accordance with a further particular aspect of the invention, the tensioner can be formed of one part or multiple parts. The multi-part configuration of the tensioner allows it to be manipulated only in sections, such as e.g. in relation to the length of the associated tensioner portion.

It is possible to provide, in the region of the guying support, a winch or a tensioner storage device which corresponds to an intermediate portion of the tensioner in such a way that it can be both shortened and lengthened, at least to a limited extent. By activating the winch or the tensioner storage device, the length of the tensioner intermediate portion can be changed in a controlled manner if required.

The manipulability, which is only limited to the tensioner intermediate portion, renders it possible to influence in a quasi-autonomous manner a part of the tensioner, which can serve in particular to pivot the luffing support or/and the guying support without influencing the orientation of the additional jib. For example, the luffing support can be changed accordingly in its inclination relative to the main jib extension or/and the additional jib by changing the length of the tensioner intermediate portion. Of course, an at least temporarily simultaneous manipulation of the entire tensioner and its tensioner intermediate portion is also feasible in order to maintain an always advantageous position of the at least one luffing support or/and the guying support e.g. in case of a change in the orientation of the additional jib. The thus possible ability to influence the orientation of the luffing support or/and the guying support can also be advantageous during the rigging of the jib system of the vehicle crane in order to maintain a constantly high transverse force proportion at the or the respective connection point of the tensioner e.g. in relation to the tensile force in the tensioner. In other words, if the tensioner is guided almost in parallel with e.g. the main jib, disproportionately high tensile forces are required to raise e.g. the additional jib because the tensile force present in the tensioner essentially introduces a normal force (pressure) into the additional jib, while the transverse force component required to pivot the additional jib reaches a value which is only very low in comparison. By increasing the angle between the tensioner and the additional jib, the value ratio between normal force and shear force is shifted accordingly, and so a lower tensile force is required in the tensioner, which simultaneously reduces the loading of the jibs as well as the extension.

In an advantageous manner, the main jib of the vehicle crane can be telescopic at least in sections. This results in a convenient and quick ability to change the length of the jib system, which is advantageous particularly during assembly and disassembly thereof. Depending on the configuration, the non-telescopic parts of the jib system can then be e.g. disassembled/assembled or/and have a pivoting capability with respect to the main jib in order to be able to comply with the maximum dimensions permitted when moving the vehicle crane, in particular on public roads.

The telescoping capability of the main jib can basically be based on its multi-part configuration which results from boxes or sections arranged one inside the other and their linear e.g. electromechanical or/and hydraulic or/and pneumatic displaceability relative to one another.

Within the scope of the invention, it is considered advantageous if the configuration of the main jib extension has an ideal ratio of material use or weight to load-bearing capability. For this purpose, the main jib extension can preferably be designed as a lattice girder and/or box girder or can be composed of a plurality of lattice girders and/or box girders. At least the main jib extension can have at least one lattice girder and/or box girder. The truss-like design of a lattice girder makes it easy for it to be assembled, disassembled and transported. The terms lattice girder and box girder are used to refer to any type of hollow body structure which can perform the function of a main jib extension.

Even if the additional jib can be connected directly to the jib head, it is considered advantageous if the connection of the main jib extension to the additional jib is established by means of an adapter. In this way, the structural luffing axis necessary for luffing the additional jib can be spaced apart from the jib head. Alternatively or additionally, said adapter itself can function as an extension in order to further enlarge the jib system as a whole.

In a particular embodiment, the main jib extension and jib head can be connected to each other in a bending-resistant manner. This means a structural connection via corresponding connection means that allow the transmission of a moment between the main jib and the main jib extension.

In accordance with a further particular embodiment, the length of the tensioner may be changeable by means of a winch arranged in or on the superstructure of the vehicle crane. Of course, the tensioner can also be fastened to the counterweight with or without a winch. In this case, the counterweight can be fixedly or movably connected to the superstructure or detached from the superstructure. The resulting change in length can be reduced e.g. to the portion between the superstructure or the counterweight and the guying support or extend beyond this to the additional jib. Of course, this can also include the tensioner intermediate portion, which has already been mentioned elsewhere and is already intrinsically changeable in length, and so a change in length can be guided through said portion at least partially to the additional jib.

The vehicle crane in accordance with the invention provides a jib system that has a high permissible bearing load despite its longer design in comparison to previously known solutions.

Some exemplified embodiments of the invention which are schematically illustrated in the figures are explained in greater detail with reference to the following description.

DESCRIPTION OF THE PREFERRED EMBODIMENTS

Figure 1:
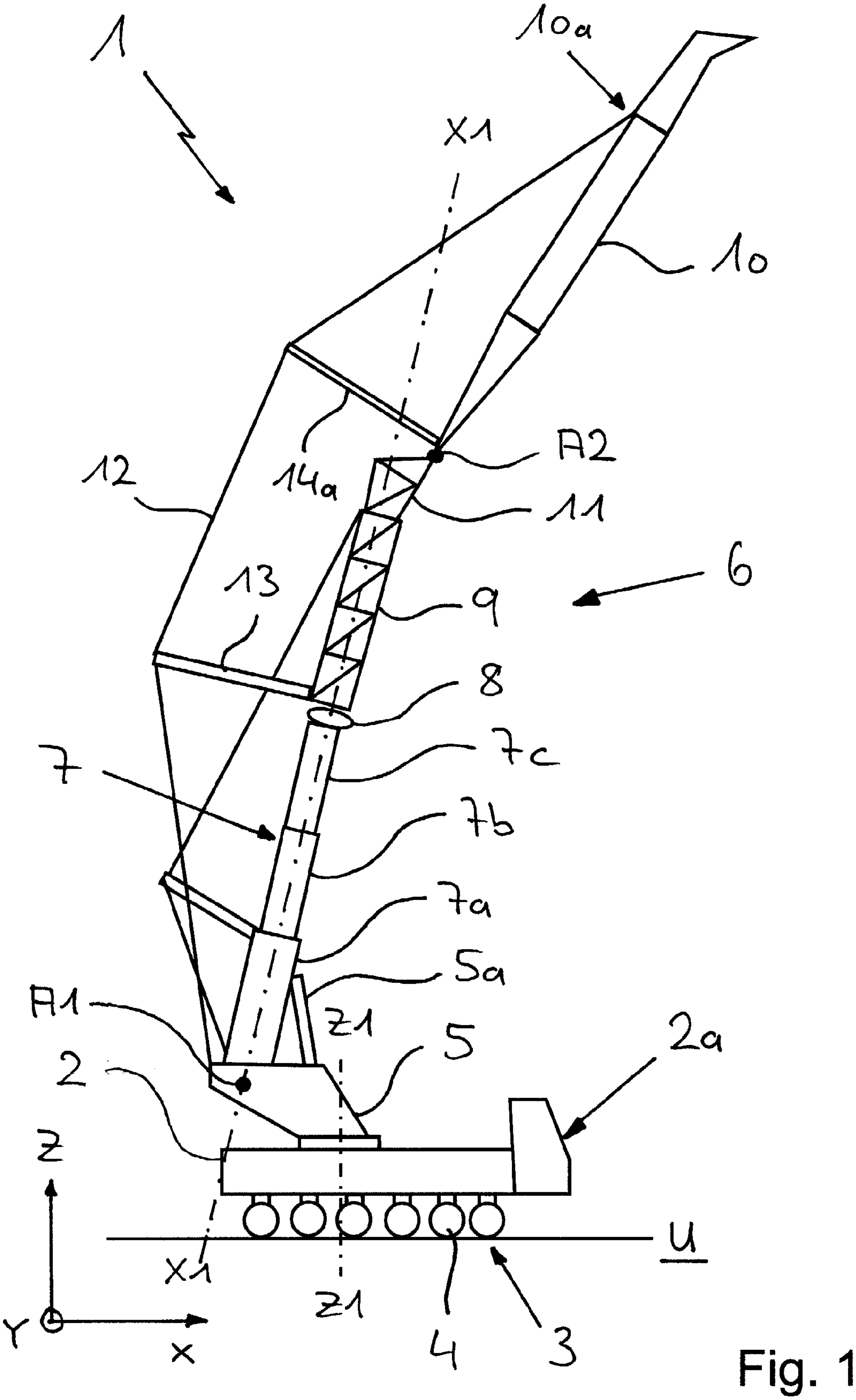
FIG. 1 shows a vehicle crane in accordance with the invention in a side view.

FIG. 1 shows the structure of a vehicle crane 1 in accordance with the invention which is parked on a ground U and has a lower carriage 2 which extends in parallel with a horizontal direction X and has a driver's cabin 2*a*. In the example shown here, the lower carriage 2 has a wheeled running gear unit 3 having six axles, on which in each case at least two wheels 4 are arranged which are spaced apart from one another in parallel with a transverse direction Y. Seated on the lower carriage 2 is a superstructure 5 which can be rotated relative to the lower carriage 2 about an axis of rotation Z1 extending in parallel with an upwards direction Z. The superstructure 5 carries a jib system 6 which is described in greater detail hereinafter:

The jib system 6 has a main jib 7 which is configured in a telescopic manner in the present exemplified embodiment. For this purpose, the main jib 7 comprises a basic box 7*a* which is mounted on the superstructure 5 so as to be luffable about a first luffing axis A1 via a linear drive 5*a* and has—purely by way of example—two inner boxes 7*b*, 7*c*. Owing to their stepped cross-sections matched to each other, the two inner boxes 7*b*, 7*c* are arranged one inside the other and within the basic box 7*a* such that these can be displaced, in particular can be hydraulically retracted and extended, linearly in a longitudinal direction X1 of the main jib 7. The last, in this respect innermost inner box 7*c* has a jib head 8 located at its free end.

It can be seen that the main jib 7 is extended by a main jib extension 9 which likewise extends in the longitudinal direction X1 of the main jib 7. The main jib extension 9 is connected to the jib head 8 of the main jib 7 in a bending-resistant manner. In the present case, the main jib extension 9 is designed purely by way of example as a lattice girder. An additional jib 10 is arranged at an end of the main jib extension 9 opposite the jib head 8 and is connected to the main jib extension 9 via an adapter 11. In this respect, the main jib extension 9 and the adapter 11 are incorporated in the present case between the jib head 8 and the additional jib 10. The main jib extension 9 is connected to the adapter 11 in a bending-resistant manner. Furthermore, the additional jib 10 is designed to be luffable in that it is mounted via a second luffing axis A2 on a free end portion of the adapter 11 opposite the main jib extension 9.

The jib system 6 is guyed via a tensile means or tensioner 12, such as a rod, cable, band or chain in a row and combinations thereof, which extends from the superstructure 5 of the vehicle crane 1 to the additional jib 10, where its free end is connected to the additional jib 10 via a connection point 10*a* in the region of a free end portion of the additional jib. The connection point 10*a* of the tensioner 12 to the additional jib 10 is located here, purely by way of example, approximately in the center of the second half of the additional jib 10 comprising the free end portion. On its way between the superstructure 5 and the additional jib 10, the tensioner 12 in the embodiment of the jib system 6 shown here is deflected twice in its total extension, in that it is guided via a guying support 13 and a first luffing support 14*a*. The guying support 13 is supported upright on the main jib extension 9 in the region of the jib head 8, while the first luffing support 14*a* is supported upright on the additional jib 10 in the region of the second luffing axis A2. In this context, by in the region of the jib head 8 is meant that the at least one guying support 13 is arranged in the region of the jib head 8. By in the region of the jib head 8 it is understood that, viewed in the longitudinal direction of the main jib 7, an area of 1 m behind the jib head 8 is covered. The tensioner 12 is deflected in each case in the region of the free ends of the guying support 13 and the first luffing support 14*a*. In a manner not shown in greater detail, a winch is arranged in or on the upper carriage 5 and corresponds to the tensioner 12 in such a way that the length of the tensioner 12 can be changed by manipulating the winch accordingly.

Depending on the configuration, guying support 13 or/and luffing support 14*a* can be fixed in their upright orientation, and so a change in the length of the tensioner 12 is directly expressed in a change in the inclination of the additional jib 10 with respect to the longitudinal direction X1 of the combination of main jib 7 and main jib extension 9 as well as adapter 11. Alternatively, the guying support 13 or/and the luffing support 14*a* can be variable in relation to the inclination either via the change in length of the tensioner 12 or/and a suitable drive in order to achieve an always advantageous distribution of the forces within the jib system 6.

Figure 2:
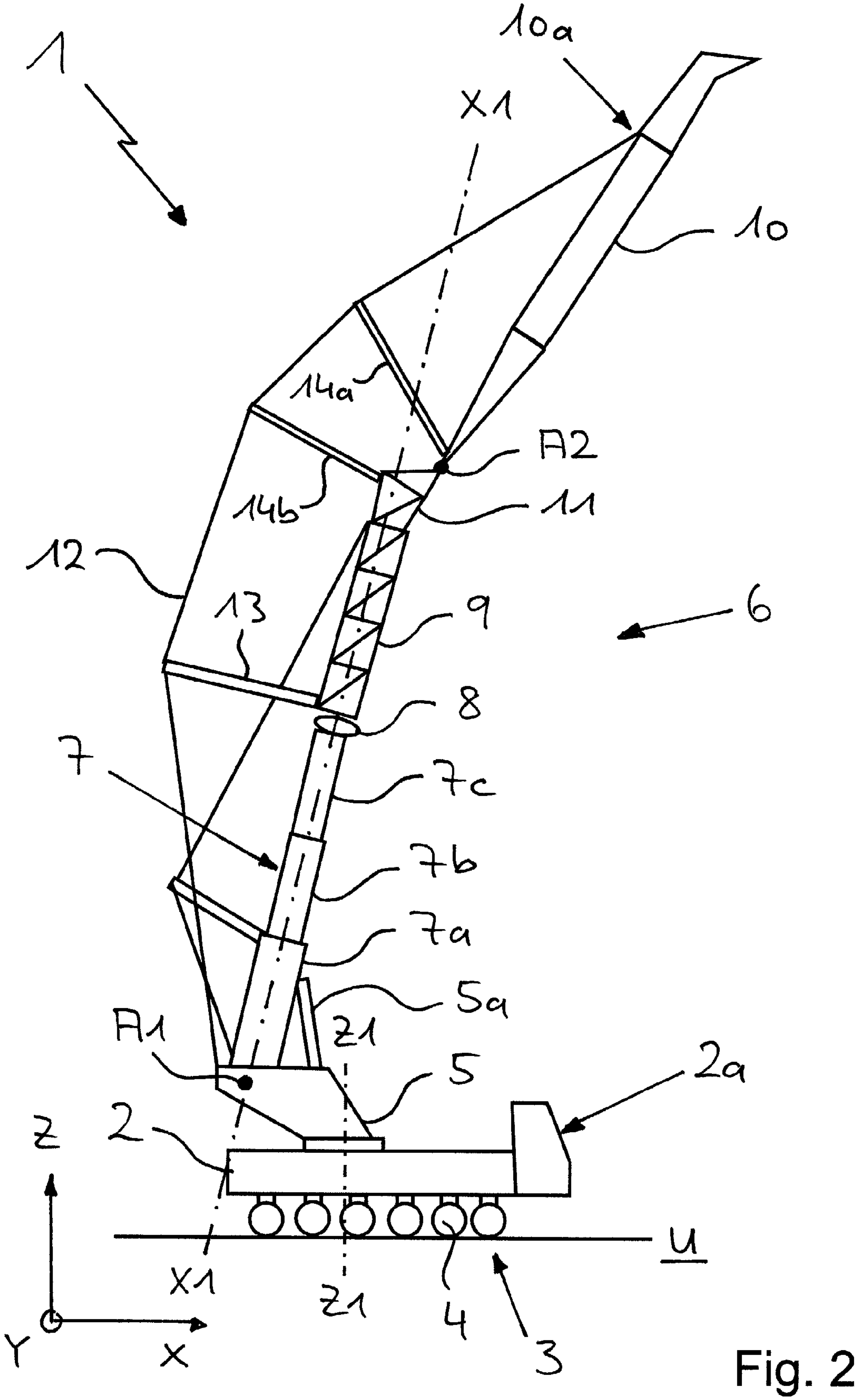
FIG. 2 shows the inventive vehicle crane of FIG. 1 in a first variant.

FIG. 2 shows a first variant of the vehicle crane 1 of FIG. 1. Like parts are designated by like reference numerals and so at this juncture, in order to avoid repetition, reference is made initially to the description of FIG. 1. In contrast to the embodiment shown in FIG. 1, the jib system 6 has a total of two luffing supports 14*a*, 14*b*, wherein the now second luffing support 14*b* is supported on the adapter 11 in the region of the second luffing axis A2. In this way, the tensioner 12 is deflected a total of three times in its extension as well as deflected via the guying support 13 and the two luffing supports 14*a*, 14*b*. From this, better angles can sometimes be achieved in relation to the guidance of the tensioner 12 in order to achieve the most advantageous possible distribution of the forces within the jib system 6.

Figure 3:
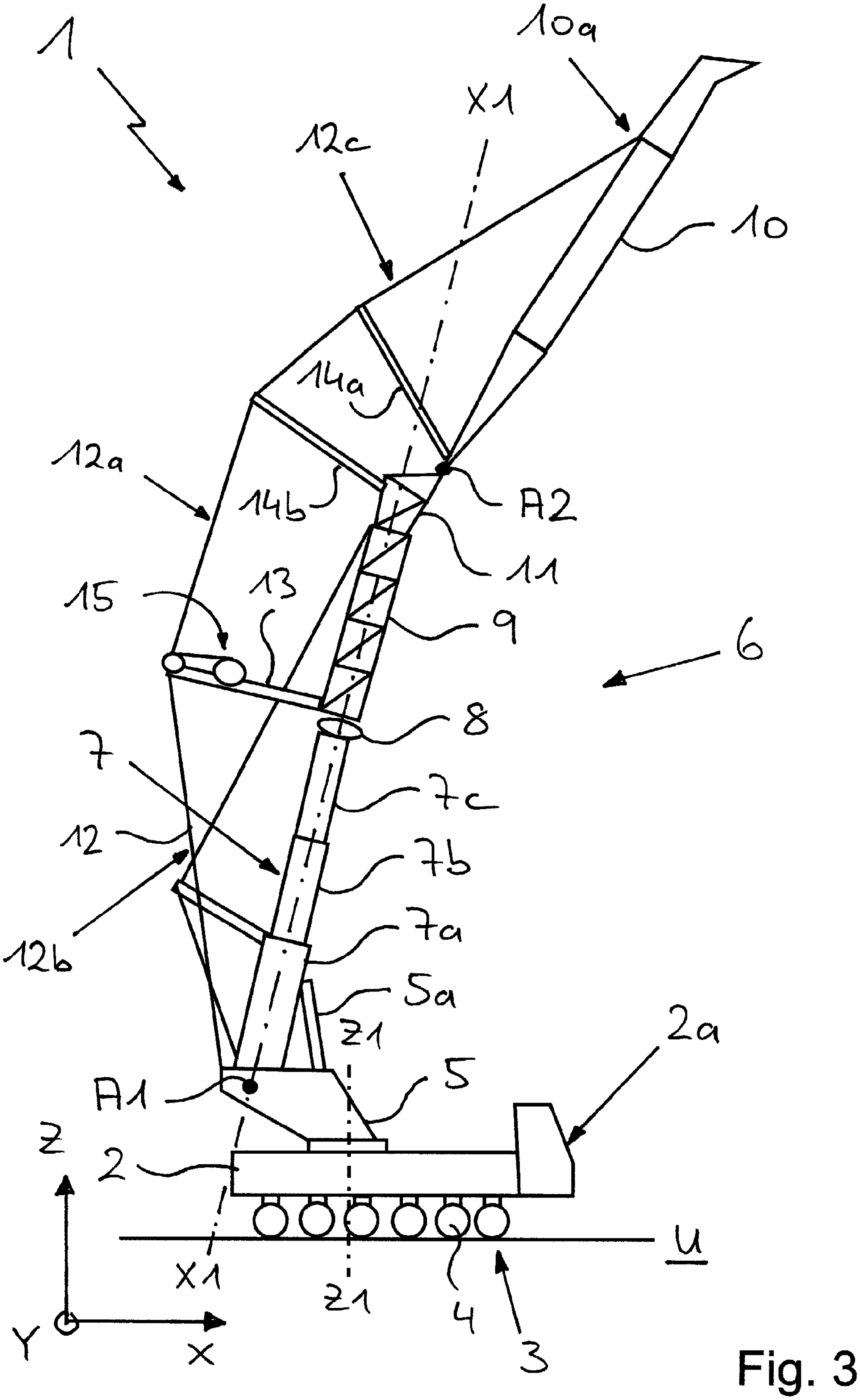
FIG. 3 shows the inventive vehicle crane of FIG. 2 in a second variant.

FIG. 3 shows a second variant of the vehicle crane 1 of FIG. 2. In this case, like parts are also designated by like reference numerals and so at this juncture, in order to avoid repetition, reference is likewise made initially to the description of FIG. 1 as well as to the description of FIG. 2. In contrast to the embodiment shown in FIG. 2, the jib system 6 shown here has a now multi-part tensioner 12, wherein the length of an intermediate portion of the tensioner 12 (hereinafter referred to as tensioner intermediate portion 12*a*) extending from the guying support 13 to the second luffing support 14*b* or/and first luffing support 14*a* can be changed. This means a change in its length independently of the other parts of the tensioner 12, which extends as a first tensioner portion 12*b* from the superstructure 5 to the guying support 13 and as a last tensioner portion 12*c* from the second luffing support 14*b* or the first luffing support 14*a* to the connection point 10*a* of the additional jib 10. The manipulability of the tensioner intermediate portion 12*a*, which is separate from the further tensioner portions 12*b*, 12*c*, is based here purely by way of example upon a winch 15, which in this case is likewise arranged purely by way of example in the region of the guying support 13. This allows the length of the tensioner intermediate portion 12*a* to be influenced in a quasi-isolated manner. By connecting the tensioner intermediate portion 12*a* to the guying support 13 and one of the luffing supports 14*a*, 14*b*, the inclination of the guying support 13 or/and at least one luffing support 14*a*, 14*b* can be changed, for instance, in that they are mounted in an appropriately articulated manner and the distance of their respective end portions from one another is changed in a targeted manner by manipulating the length of the tensioner intermediate portion 12*a*.

It is also conceivable that the tensioner 12 does not start from the superstructure 5 of the vehicle crane 1 but instead from a preferably free-floating counterweight, not shown in the figure. It is also conceivable to have tensioner 12 which start next to one another from the superstructure 5 and the counterweight.

The invention claimed is:

1. A vehicle crane, said vehicle crane comprising:

a superstructure with a jib system that has a main jib, which is mounted in a luffable manner on the superstructure, with a jib head and a luffable additional jib and at least one luffing support supported in the region of a luffing axis of the additional jib;

wherein at least one guying support of the jib system is arranged such that a tensioner starting on the one hand from the superstructure and/or from a counterweight and connected on the other hand to the additional jib is guided via the at least one guying support and the at least one luffing support, wherein a main jib extension is incorporated between the jib head and the additional jib, and wherein the at least one guying support is supported at the main jib extension within one meter of the jib head with respect to the longitudinal direction of the main jib, and wherein the main jib extension has at least a length of 6 m.

2. The vehicle crane of claim 1, wherein the main jib extension has at least a length of 12 m.

3. The vehicle crane as claimed in claim 1, wherein a length of an intermediate portion of the tensioner extending at least partially from the at least one guying support to the luffing support can be changed.

4. The vehicle crane as claimed in claim 3, wherein the length of the intermediate portion of the tensioner can be changed independently of the rest of the tensioner.

5. The vehicle crane as claimed in claim 3, wherein a winch or a tensioner storage device is provided in the region of the at least one guying support, by means of which the length of the intermediate portion of the tensioner can be changed.

6. The vehicle crane as claimed in claim 3, wherein an inclination of the luffing support can be changed relative to the main jib extension and/or to the additional jib via a change in length of the intermediate portion of the tensioner.

7. The vehicle crane as claimed in claim 1, wherein the tensioner is formed of one part or multiple parts.

8. The vehicle crane as claimed in claim 1, wherein the main jib comprises sections and is telescopic.

9. The vehicle crane as claimed in claim 1, wherein the main jib extension comprises a lattice girder and/or a box girder.

10. The vehicle crane as claimed in claim 1, wherein the additional jib is connected to the main jib extension by an adapter.

11. The vehicle crane as claimed in claim 1, wherein the main jib extension and the jib head are connected to one another in a bending-resistant manner.

12. The vehicle crane as claimed in claim 1, wherein the length of the tensioner can be changed by via a winch arranged in or on the superstructure or the counterweight.

13. A vehicle crane, said vehicle crane comprising:

a superstructure with a jib system that has a main jib, which is mounted in a luffable manner on the superstructure, with a jib head and a luffable additional jib and at least one luffing support supported in the region of a luffing axis of the additional jib;

wherein at least one guying support of the jib system is arranged such that a tensioner starting on the one hand from the superstructure and/or from a counterweight and connected on the other hand to the additional jib is guided via the at least one guying support and the at least one luffing support, wherein a main jib extension having a length of at least 6 m is incorporated between the jib head and the additional jib, and wherein the at least one guying support is supported at the main jib extension within one meter of the jib head with respect to the longitudinal direction of the main jib, and wherein a length of an intermediate portion of the tensioner extending at least partially from the at least one guying support to the luffing support can be changed.

14. The vehicle crane of claim 13, wherein the main jib extension has at least a length of 12 m.

15. The vehicle crane as claimed in claim 13, wherein the length of the intermediate portion of the tensioner can be changed independently of the rest of the tensioner.

16. The vehicle crane as claimed in claim 13, wherein a winch or a tensioner storage device is provided in the region of the at least one guying support, by means of which the length of the intermediate portion of the tensioner can be changed.

17. The vehicle crane as claimed in claim 13, wherein an inclination of the luffing support can be changed relative to the main jib extension and/or to the additional jib via a change in length of the intermediate portion of the tensioner.

18. The vehicle crane as claimed in claim 13, wherein the main jib comprises sections and is telescopic, and wherein the main jib extension comprises a lattice girder and/or a box girder.

19. The vehicle crane as claimed in claim 13, wherein the length of the tensioner can be changed by via a winch arranged in or on the superstructure or the counterweight.

* * * * *